United States Patent
Bansal et al.

(10) Patent No.: US 7,608,186 B2
(45) Date of Patent: Oct. 27, 2009

(54) COATED ASYMMETRIC MEMBRANE SYSTEM HAVING OLEOPHOBIC AND HYDROPHILIC PROPERTIES

(75) Inventors: Vishal Bansal, Overland Park, KS (US); Hieu Minh Duong, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 192 days.

(21) Appl. No.: 11/694,590

(22) Filed: Mar. 30, 2007

(65) Prior Publication Data

US 2008/0241504 A1  Oct. 2, 2008

(51) Int. Cl.
*B01D 71/26* (2006.01)
*B01D 39/00* (2006.01)
*B01D 29/00* (2006.01)

(52) U.S. Cl. ............... 210/500.37; 210/500.27; 210/490; 210/500.36; 428/315.9; 156/333.7

(58) Field of Classification Search ............ 210/500.27, 210/500.37, 500.42, 490, 500.36; 428/35.7, 428/315.9, 315.5, 319.3, 422, 308.4; 422/77, 422/48; 156/331.7
See application file for complete search history.

(56) References Cited

U.S. PATENT DOCUMENTS

| | | | |
|---|---|---|---|
| 4,761,233 A * | 8/1988 | Linder et al. ........... 210/500.37 |
| 5,209,850 A * | 5/1993 | Abayasekara et al. .. 210/500.36 |
| 5,279,856 A | 1/1994 | Koyama et al. |
| 5,352,511 A * | 10/1994 | Abayasekara et al. .... 428/308.4 |
| 5,976,380 A | 11/1999 | Moya |
| 5,993,489 A * | 11/1999 | Lewis et al. ................. 623/1.13 |
| 6,143,675 A * | 11/2000 | McCollam et al. .......... 442/221 |
| 6,199,979 B1 * | 3/2001 | Hobson et al. ................ 347/93 |
| 6,261,678 B1 * | 7/2001 | von Fragstein et al. ... 428/315.9 |
| 6,395,383 B1 * | 5/2002 | Maples ..................... 428/319.3 |
| 6,410,084 B1 | 6/2002 | Klare et al. |
| 6,551,927 B1 * | 4/2003 | Chen et al. ................... 438/664 |
| 6,676,993 B2 | 1/2004 | Klare |
| 6,770,202 B1 | 8/2004 | Kidd et al. |
| 6,854,603 B2 * | 2/2005 | Klare ........................ 210/490 |
| 6,884,350 B2 * | 4/2005 | Muller .................. 210/500.36 |
| 6,977,043 B2 | 12/2005 | Cheng et al. |
| 7,300,022 B2 * | 11/2007 | Muller ......................... 246/41 |
| 7,306,841 B2 * | 12/2007 | Ruefer et al. ............. 428/317.9 |
| 7,381,331 B2 * | 6/2008 | Duong et al. .......... 210/500.42 |
| 7,404,896 B2 * | 7/2008 | Muller .................. 210/500.38 |
| 2004/0035782 A1 * | 2/2004 | Muller ....................... 210/490 |
| 2004/0191894 A1 * | 9/2004 | Muller et al. ............. 435/297.1 |

* cited by examiner

*Primary Examiner*—Ana M Fortuna
(74) *Attorney, Agent, or Firm*—Armstrong Teasdale LLP

(57) ABSTRACT

A porous membrane assembly includes, in an exemplary embodiment, a porous membrane substrate having hydrophobic properties. The membrane substrate includes a first side, an opposing second side and a plurality of pores extending therethrough. The membrane substrate also includes a discontinuous layer of an oleophobic coating applied to the first side so that the plurality of pores in the first side are substantially free of the oleophobic coating, and a continuous layer of an amine containing hydrophilic polymer coating applied to the second side of the membrane substrate.

16 Claims, 2 Drawing Sheets

COATED ASYMMETRIC MEMBRANE SYSTEM HAVING OLEOPHOBIC AND HYDROPHILIC PROPERTIES

STATEMENT REGARDING FEDERALLY SPONSORED RESEARCH & DEVELOPMENT

This invention was made with Government support under contract number W911QY-05-C-0102 awarded by U.S. Army Natick Soldier Research Development and Engineering Center, Natick, Mass. The Government has certain rights in the invention.

BACKGROUND OF THE INVENTION

This invention relates generally to asymmetric porous membranes, their laminates, and more particularly, to asymmetric porous membranes having oleophobic properties on one side and hydrophilic properties on an opposing side.

It is generally known that a porous membrane may have at least one property that may be limited by the material from which the membrane is made. For example, a porous membrane made from polytetrafluoroethylene (PTFE) material may have excellent hydrophobic properties, have low surface energy, and may be extremely inert. Therefore, it may be difficult to chemically or mechanically attach a different material to the ePTFE material. For example, U.S. Pat. No. 5,976,380 describes bonding a hydrophilic coating to the surface of a porous PTFE membrane by wetting the membrane with the solution, or with a wetting agent such as methanol, ethanol, isopropanol, or acetone, and then applying the solution under pressure.

Protective clothing designed for use against chemical and biological threats has been developed using many advanced materials available today. The joint service lightweight integrated suit technology (JSLIST) worn by military personnel, for example, consists of an air-permeable carbon-based chemical protective over-garment, with a water-repellent-treated cotton/nylon ripstop fabric shell and a carbon-bonded tricot liner. However, at least some known protective suits are considered heavy and uncomfortable because of the materials used in fabricating the suit, especially those that use carbon-based materials and/or have low perspiration permeability and a low moisture vapor transmission rate (MVTR).

BRIEF DESCRIPTION OF THE INVENTION

In one aspect, a porous membrane assembly is provided that includes a porous membrane substrate having hydrophobic properties. The membrane substrate includes a first side, an opposing second side and a plurality of pores extending therethrough. The membrane substrate also includes a discontinuous layer of an oleophobic coating applied to the first side so that the plurality of pores in the first side are substantially free of the oleophobic coating, and a continuous layer of an amine containing hydrophilic polymer coating applied to the second side of the membrane substrate.

In another aspect, a method of manufacturing a porous membrane assembly is provided. The method includes providing a porous membrane substrate having hydrophobic properties, where the membrane substrate includes a first side, an opposing second side and a plurality of pores extending therethrough. The method also includes forming a discontinuous layer of an oleophobic coating by applying the oleophobic coating to the first side of the membrane substrate so that the plurality of pores in the first side are substantially free of the oleophobic coating, and forming a continuous layer of an amine containing hydrophilic polymer coating by applying the amine containing hydrophilic polymer coating to the second side of the membrane substrate.

DETAILED DESCRIPTION OF THE INVENTION

An asymmetric porous membrane in accordance with an exemplary embodiment and a method of making the porous membrane are described in more detail below. The asymmetric porous membrane, in an exemplary embodiment, is an expanded PTFE membrane that has an oliophobic coating on one side and a hydrophilic coating on the opposite side. The asymmetric porous membrane can be used in fabricating a chemical protective laminate. The asymmetric porous membrane is waterproof, when combined with appropriate textile fabrics, and provides a barrier against chemical and biological warfare agents, while possessing a good moisture vapor transmission rate (MVTR).

Figure 1:
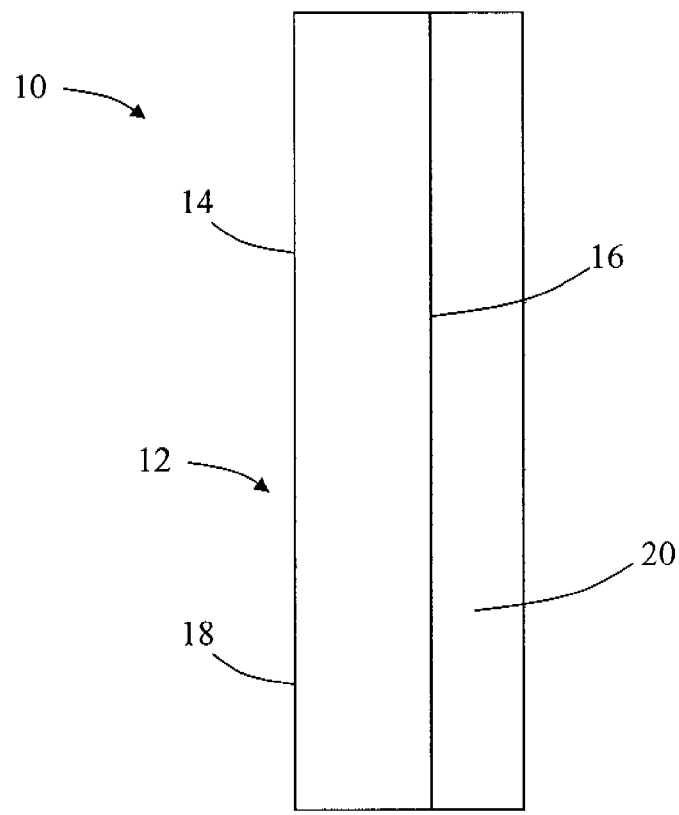
FIG. 1 is a cross-sectional schematic illustration of an exemplary embodiment of an asymmetric porous membrane.

Referring to the drawings, FIG. 1 is a cross-sectional schematic illustration of an exemplary embodiment of an asymmetric porous membrane 10 that includes a base substrate 12. Membrane substrate 12 can be formed from any suitable material, for example, PTFE. Substrate 12 formed from PTFE has hydrophobic properties due to the surface tension properties of PTFE. Substrate 12 has a first side 14 and an opposing second side 16. First side 14 of substrate 12 is treated with a oleophobic material 18 to impart oleophobic properties to first side 14. A hydrophilic coating 20 is deposited on second side 16 to impart hydrophilic properties to second side 16.

Oleophobic material 18 can be any suitable material, such as, a fluorinated polymer material that enhances the oleophobic properties without compromising the gas permeability of membrane 10. Suitable examples of fluorinated polymers include, but are not limited to, fluorinated urethane polymers, perfluro alkyl acrylic(methacrylic) copolymers, random copolymers composed of fluorinated acrylate(methacylate), butyl acrylate or a comparable n-alkyl acrylate(methacrylate). Fluorinated polymers are available from DuPont under the trade name Zonyl®. Oleophobic material 18 is deposited on first side 14 of substrate 12 such that the membrane pores contain substantially none of oleophobic material 18 which leaves substrate 12 porous.

Hydrophilic coating 20 can be any suitable coating, such as, an amine-containing hydrophilic polymer. Any suitable amine-containing hydrophilic polymer can be used in hydrophilic coating 20, for example, polyvinyl alcohol-coamine polymers. Polyvinyl alcohol-coamine polymers are commercially available from, Celanese under the trade name Erkol®. Hydrophilic coating 20 is deposited on second side 16 of substrate 12 as a continuous film covering the surface of second side 16, including the pores. In one embodiment, to impart wash durability to the end article, hyrdrophilic coating 20 may be cross-linked using a suitable cross-linking polymer, such as, but not limited to, Polycup® 172, commercially available from Hercules, Inc., Wilmington, Del.

Figure 2:
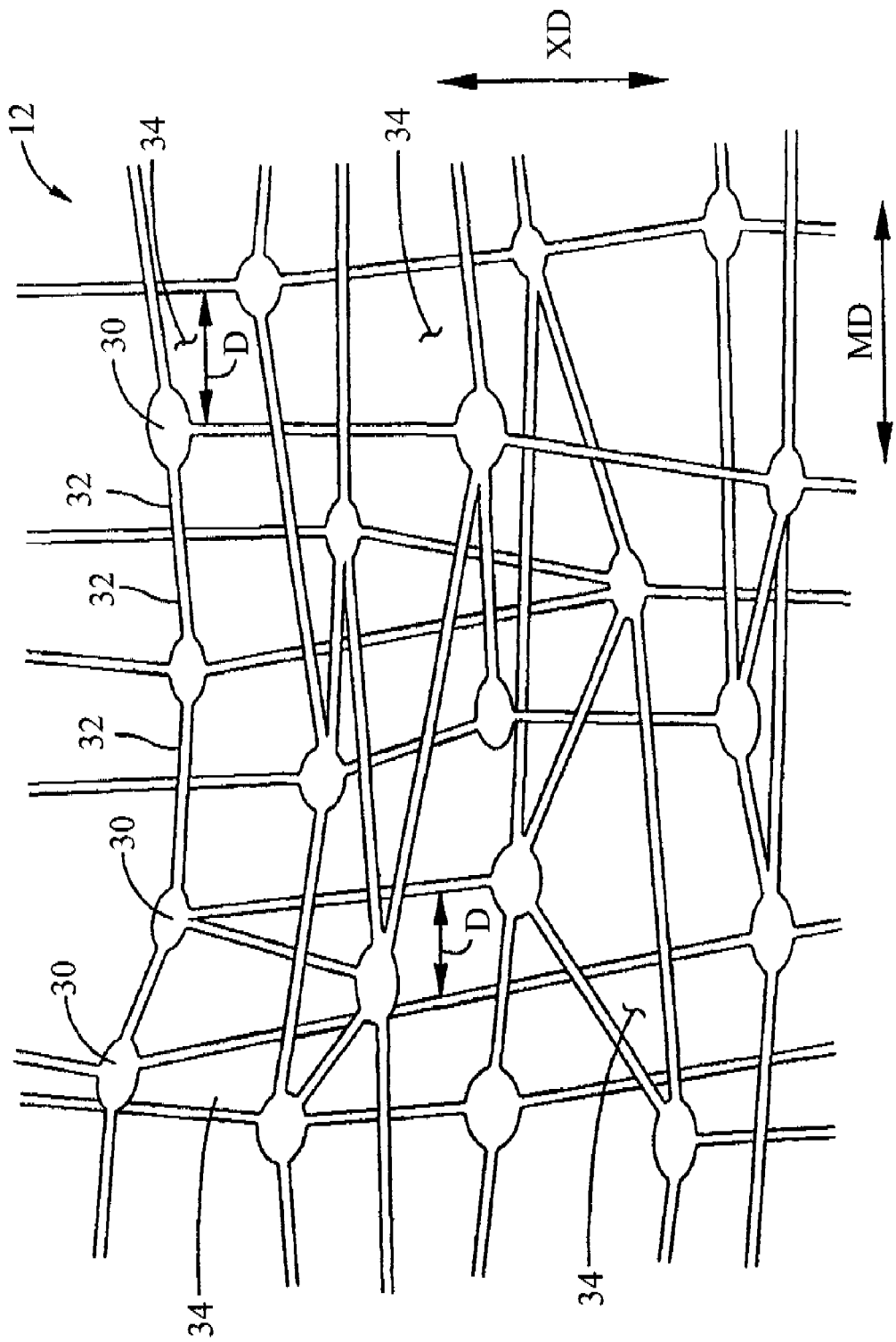
FIG. 2 is an enlarged schematic illustration of a portion of the permeable membrane shown in FIG. 1.

Referring also to FIG. 2, membrane substrate 12 includes a three-dimensional matrix or lattice type structure that is formed by a plurality of nodes 30 interconnected by a plurality of fibrils 32. Surfaces of nodes 30 and fibrils 32 define a plurality of pores 34 in membrane substrate 12. Membrane substrate 12 is made from any suitable material, and in the exemplary embodiment is made of expanded polytetrafluoroethylene (ePTFE) that has been at least partially sintered. Generally, the size of a fibril 32 that has been at least partially sintered is in the range of about 0.05 micrometer (μm) to about 0.5 μm in diameter taken in a direction normal to the longitudinal extent of the fibrin. In the exemplary embodiment, membrane substrate 12 has a weight of about 0.1 to about 1.0 ounces per square yard.

Surfaces of nodes 30 and fibrils 32 define numerous interconnecting pores 34 that extend completely through membrane substrate 12 between opposite major side surfaces in a tortuous path. In the exemplary embodiment, the average effective pore size of pores 34 is sufficient to permit gases to pass through membrane substrate 12 and prevent liquid from passing through membrane substrate 12. A suitable average effective pore size D for pores 34 is in the range of about 0.01 μm to about 10 μm, and in another embodiment, in the range of about 0.1 μm to about 5.0 μm. In the exemplary embodiment, membrane substrate 12 has an air permeability of at least about 0.10 cubic foot of air per minute per square foot of membrane substrate 12 as measured by ASTM D-737. Also, in the exemplary embodiment, membrane substrate 12 has a moisture vapor transmission rate greater than about 22,000 $g/m^2$/day as measured by ISO 15496.

In the exemplary embodiment, membrane substrate 12 is made by extruding a mixture of polytetrafluoroethylene (PTFE) fine powder particles and lubricant. The extrudate is calendered, and then the calendered extrudate is "expanded" or stretched in at least one and preferably two directions, MD and XD, to form fibrils 32 connecting nodes 30 to define a three-dimensional matrix or lattice type of structure. "Expanded" is intended to mean sufficiently stretched beyond the elastic limit of the material to introduce permanent set or elongation to fibrils 32. Membrane substrate 12 is then heated or "sintered" to reduce and minimize residual stress in the membrane material by changing portions of the material from a substantially crystalline state to a substantially amorphous state. In an alternate embodiment, membrane substrate 12 is unsintered or partially sintered as is appropriate for the contemplated end use of the membrane.

In the exemplary embodiment, membrane substrate 12 is made from polytetrafluoroethylene (PTFE) film that has been expanded to form an open pore structured membrane known as expanded polytetrafluoroethylene (ePTFE). In alternate embodiments, woven polytetrafluoroethylene and non-woven polytetrafluoroethylene are used to make membrane substrate 12. Other materials and methods can be used to form a suitable base membrane substrate 12 that has an open pore structure. For example, other suitable materials include, but are not limited to, polyolefin, polyamide, polyester, polysulfone, polyether, acrylic and methacrylic polymers, polystyrene, polyurethane, polypropylene, polyethylene, and $CaCO_3$ filled polyethylene. Other suitable methods of making a porous membrane include foaming, skiving or casting any of the suitable materials.

Figure 3:
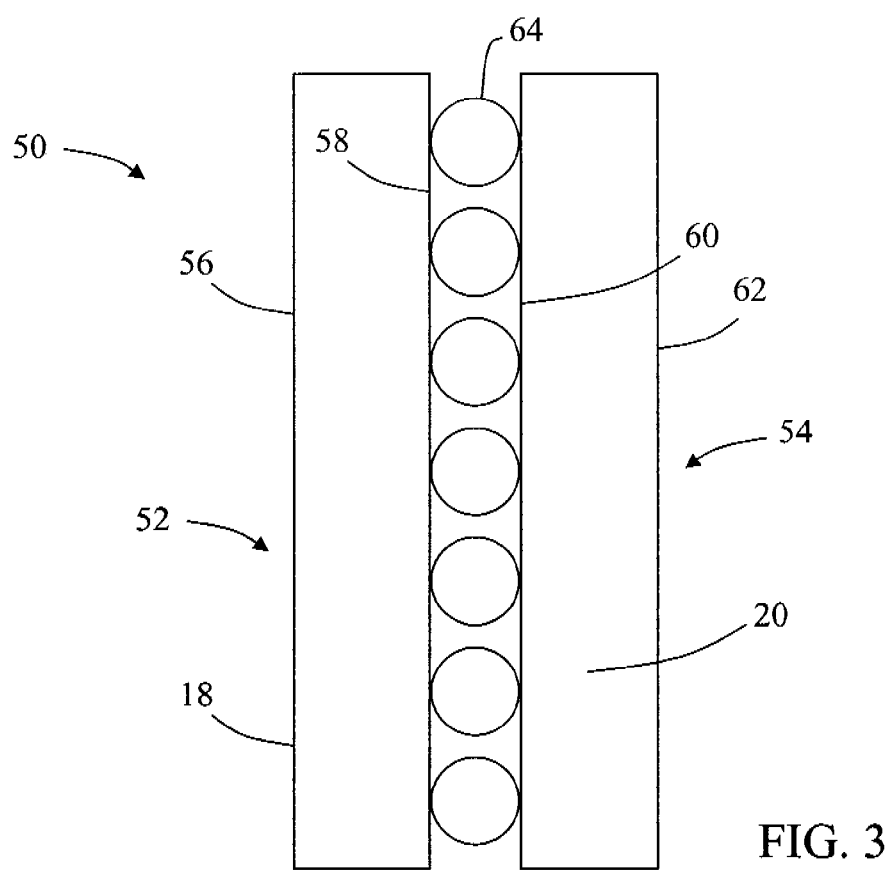
FIG. 3 is a cross-sectional schematic illustration of another exemplary embodiment of an asymmetric porous membrane.

FIG. 3 is a cross-sectional schematic illustration of another exemplary embodiment of an asymmetric porous membrane 50 that includes a first base membrane substrate 52 and a second base membrane substrate 54 bonded together. The bonding may be done using any known appropriate adhesive or thermal lamination process that enables asymmetric porous membrane 50 to function as described herein. First membrane substrate 52 has a first side 56 and an opposing second side 58. Second membrane substrate 54 has a first side 60 and a second side 62. Second side 58 of first membrane substrate is bonded to first side 60 of second membrane substrate 54 with an adhesive 64, or any other appropriate lamination process. First and second membrane substrates 52 and 54 is similar to membrane substrate 12 described above and includes nodes 30 and fibrils 32.

Membrane substrates 52 and 54 can be formed from any suitable material, for example, PTFE, similar to membrane substrate 12 described above. Substrates 52 and 54 formed from PTFE have hydrophobic properties due to the surface tension properties of PTFE. Membrane substrate 52 is treated with oleophobic material 18 to impart oleophobic properties. Other materials can be used to form a base membrane substrates 52 and 54 that have an open pore structure. For example, other suitable materials include, but are not limited to, polyolefin, polyamide, polyester, polysulfone, polyether, acrylic and methacrylic polymers, polystyrene, polyurethane, polypropylene, polyethylene, and $CaCO_3$ filled polyethylene. Other suitable methods of making a porous membrane include foaming, skiving or casting any of the suitable materials.

Second membrane substrate 54 is filled with hydrophilic coating 20 before second membrane 54 is bonded to first membrane substrate 52. Hydrophilic coating 20, in an exemplary embodiment is dip coated onto second membrane substrate 52 and into pores 34 of membrane substrate 52 before adhesively laminating second substrate 54 to oleophobically treated membrane substrate 52.

While the invention has been described in terms of various specific embodiments, those skilled in the art will recognize that the invention can be practiced with modification within the spirit and scope of the claims.

What is claimed is:

1. A porous membrane assembly comprising:
    a first porous membrane substrate having hydrophobic properties, said first membrane substrate comprising a first side, an opposing second side and a plurality of pores extending from said first side to said second side;
    a discontinuous layer of an oleophobic coating applied to said first side of said first membrane substrate so that said plurality of pores in said first side are substantially free of said oleophobic coating;
    a second porous membrane substrate having a first side, an opposing second side, and a plurality of pores extending therethrough, said second side of said first membrane substrate bonded to said first side of said second membrane substrate by a discontinuous layer of an adhesive; and
    a continuous layer of an amine containing hydrophilic polymer coating applied to said second side of said second membrane substrate.

2. A porous membrane assembly in accordance with claim 1 wherein said first and second porous membrane substrates comprises expanded polytetrafluoroethylene, woven polytetrafluoroethylene, or non-woven polytetrafluoroethylene.

3. A porous membrane assembly in accordance with claim 1 wherein said first and second porous membrane substrates comprises expanded polytetrafluoroethylene.

4. A porous membrane assembly in accordance with claim 1 wherein said amine containing hydrophilic polymer coating comprises a polyvinyl alcohol-coamine polymer.

5. A porous membrane assembly in accordance with claim 1 wherein said oleophobic coating comprises a fluorinated polymer.

6. A porous membrane assembly in accordance with claim 5 wherein said fluorinated polymer is selected from the group consisting of fluorinated urethane polymers, perfluro alkyl acrylic copolymers, perfluro alkyl methacrylic copolymers, and random copolymers of fluorinated acrylate, fluorinated methacrylate, fluorinated, fluorinated n-alkyl acrylate, and fluorinated n-alkyl methacrylate.

7. A porous membrane assembly in accordance with claim 1 wherein said plurality of pores are about 0.01 µm to about 10 µm.

8. A porous membrane assembly in accordance with claim 1 wherein said amine containing hydrophilic polymer coating additionally fills said pores of said second membrane substrate.

9. A method of manufacturing a porous membrane assembly, said method comprising:
  providing a first porous membrane substrate having hydrophobic properties, the first membrane substrate comprising a first side, an opposing second side and a plurality of pores extending therethrough;
  forming a discontinuous layer of an oleophobic coating by applying the oleophobic coating to the first side of the first membrane substrate so that the plurality of pores in the first side are substantially free of the oleophobic coating;
  bonding a second porous membrane substrate having a first side, an opposing second side, and a plurality of pores extending therethrough, to the first membrane substrate, the second side of the first membrane substrate bonded to the first side of the second membrane substrate with a discontinuous layer of an adhesive; and
  forming a continuous layer of an amine containing hydrophilic polymer coating by applying the amine containing hydrophilic polymer coating to the second side of the second membrane substrate.

10. A method in accordance with claim 9 wherein the first and second porous membrane substrate comprises expanded polytetrafluoroethylene, woven polytetrafluoroethylene, or non-woven polytetrafluoroethylene.

11. A method in accordance with claim 9 wherein the first and second membrane substrates comprise expanded polytetrafluoroethylene membrane substrates.

12. A method in accordance with claim 9 wherein the amine containing hydrophilic polymer coating comprises a polyvinyl alcohol-coamine polymer.

13. A method in accordance with claim 9 wherein the oleophobic coating comprises a fluorinated polymer.

14. A method in accordance with claim 13 wherein the fluorinated polymer is selected from the group consisting of fluorinated urethane polymers, perfluro alkyl acrylic copolymers, perfluro alkyl methacrylic copolymers, and random copolymers of fluorinated acrylate, fluorinated methacrylate, fluorinated, fluorinated n-alkyl acrylate, and fluorinated n-alkyl methacrylate.

15. A method in accordance with claim 9 wherein the plurality of pores are about 0.01 µm to about 10 µm.

16. A method in accordance with claim 9 wherein forming a continuous layer of an amine containing hydrophilic polymer coating comprises:
  forming a continuous layer of an amine containing hydrophilic polymer coating by applying the amine containing hydrophilic polymer coating to the second membrane substrate so that the pores of the second membrane substrate are additionally filled with the amine containing hydrophilic polymer coating.

* * * * *